(12) United States Patent
Bawab et al.

(10) Patent No.: US 8,428,890 B2
(45) Date of Patent: Apr. 23, 2013

(54) DEVICE FOR MEASURING LOAD AND DEFLECTION OF MATERIALS

(75) Inventors: Sebastian Bawab, Norfolk, VA (US);
Stacie Ringleb, Norfolk, VA (US);
Manish G. Kalmegh, Norfolk, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 325 days.

(21) Appl. No.: 12/707,233

(22) Filed: Feb. 17, 2010

(65) Prior Publication Data
US 2010/0211331 A1 Aug. 19, 2010

Related U.S. Application Data

(60) Provisional application No. 61/152,993, filed on Feb. 17, 2009.

(51) Int. Cl.
*G01L 1/00* (2006.01)
*G06F 11/30* (2006.01)

(52) U.S. Cl.
USPC .............. 702/43; 702/121; 702/182; 702/184

(58) Field of Classification Search .............. 702/43–47, 702/121–123, 182–189
See application file for complete search history.

(56) References Cited

U.S. PATENT DOCUMENTS
6,539,809 B1 * 4/2003 Weiss et al. .................. 73/825

* cited by examiner

*Primary Examiner* — Phuong Huynh
(74) *Attorney, Agent, or Firm* — Novak Druce Connolly Bove + Quigg LLP

(57) ABSTRACT

A system for measuring normal load and deflection of a material that includes a portable load deflection device and a method of using the same is disclosed. The system includes a support arm having a first end and a second end opposite said first end. The first end can be attached to a base surface. The support arm can provides at least three degrees of freedom of movement and includes at least one sensor for determining a position of the second end. A uniaxial load cell can be operably attached to the second end. The system can also include a processing system operable to receive position data and corresponding force data when the support arm is used to apply a non-normal compression force to the test surface. The data can be used to calculate normal force versus deflection data for the test surface.

20 Claims, 7 Drawing Sheets

DEVICE FOR MEASURING LOAD AND DEFLECTION OF MATERIALS

CROSS-REFERENCE TO RELATED APPLICATIONS

This application claims priority to U.S. Provisional Application No. 61/152,993, entitled "Device for Measuring Load and Deflection of Materials," filed Feb. 17, 2009, the entirety of which is incorporated herein by reference.

FIELD OF THE INVENTION

This invention relates to mechanical testing equipment, and more particularly to load and deflection testing equipment.

BACKGROUND OF THE INVENTION

There are many other load determining devices that have been developed for smaller and higher loads, for a particular use and for specific materials. For example, a device was developed to meet the requirements of FMVSS 202 for head restraints to reduce the frequency and severity of neck injury in rear-end and other collisions. This device was bulky and could not be used at different orientations. In another example, a device developed to measure the load deflection of the thorax is less accurate because the load was applied using a screw. Another device developed to measure the stress strain properties of human skin cannot be used in other orientations without another setup and has a small span of workspace where it can reach. Another device developed to measure the load displacement of a biological membrane had a very small load range, which thereby limits the usefulness of the device.

SUMMARY OF THE INVENTION

A system for measuring normal load and deflection of a material that can include a portable load deflection device, having a support arm having a first end and a second end opposite the first end is disclosed. The first end can be designed for attachment to a base surface. The support arm can provide at least three degrees of freedom of movement and include at least one sensor for determining a position of said second end. The second end can include a uniaxial load cell operably attached to the support arm. The second end further can also include an end effector operably attached to the uniaxial load cell, with the uniaxial load cell operably attached to the support arm.

The system can include a processing system in communication with the portable load deflection device. The processing system can be operable to receive position data from the portable load deflection device and corresponding force data from the load cell when the second end is used to apply a compression force to a test surface. The processing system can also be operable to calculate normal force versus deflection data for said test surface resulting from non-normal application of said compression force.

In another embodiment, the invention is drawn to a method for measuring normal load and deflection of a material. The method can include using a portable load deflection device having a uniaxial load cell and applying a non-normal compression force to a test surface using a portion of the portable load deflection device adjacent to a uniaxial load cell. The method can also include obtaining position data and corresponding force data during the applying step, and determining normal force versus deflection data for the test surface resulting from the non-normal compression force.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
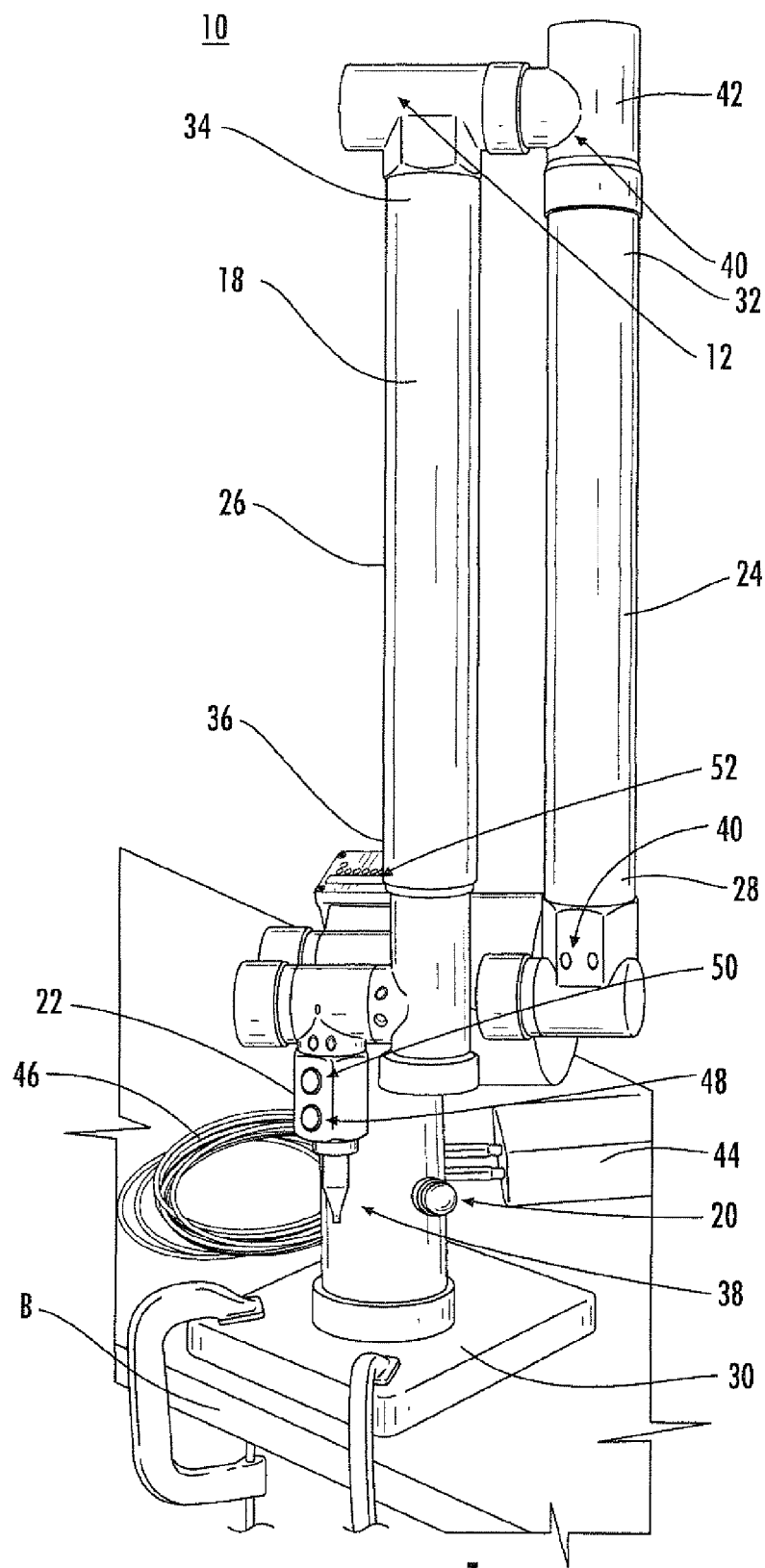
FIG. 1 is a drawing of a system as disclosed herein, including a support arm, a uniaxial load cell, an end effector, a deflection measuring actuator and a position measuring actuator.
Figure 2:
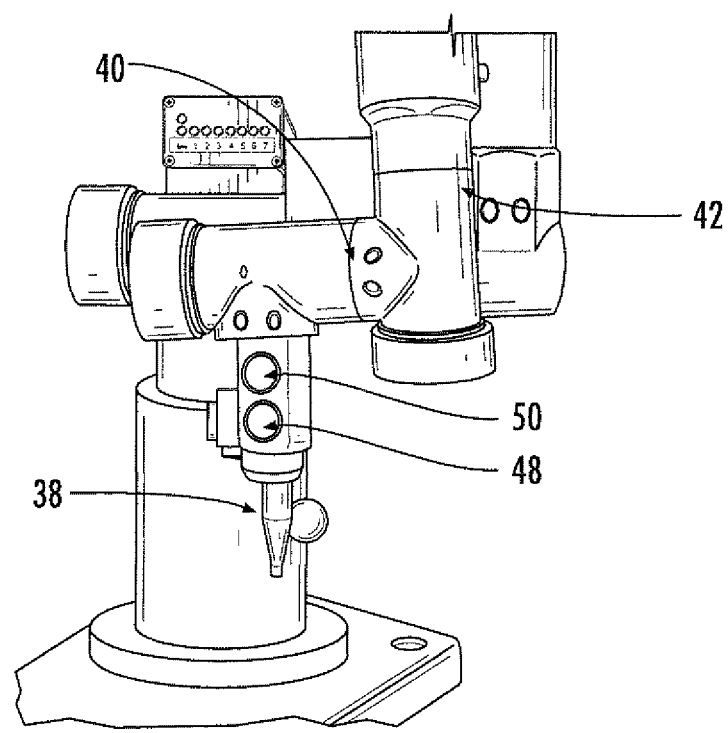
FIG. 2 is a drawing of a system including the second end, a deflection measuring actuator and a position measuring actuator.

As shown in FIGS. 1-10, this invention is directed to a system 10 that includes a portable load deflection device 12 capable of determining deflection versus load for any material, ranging from mechanical objects to in vivo studies in biomechanics. The portable load deflection device 12 can be capable of determining a load applied to a surface 14 even when the load is applied at an angle up to about 20 degrees or even up to about 40 degrees with a unidirectional load cell 16. Knowing normal load and deflection characteristics of a material is important because the characteristics provide a description of the behavior of a material under various conditions. While many load-deflection measurement systems have been developed for a specific use, specific material and for a specific range, there are no devices to measure load-deflection that include the following parameters: small size and weight, have a load range of up to 100 lbs., can be used at any orientation, can be validated against material testing machines and can be used for any testing materials.

The system 10 for measuring normal load and deflection of a material can include a portable load deflection device 12 that includes a support arm 18. The support arm 18 can have a first end 20 and a second end 22 opposite said first end 20. The first end 20 can be designed for attachment to a base surface (B), including, but not limited to, a table, the floor, or a machine. The support arm 18 can provide at least three degrees of freedom of movement. The support arm 18 can provide at least four degrees of freedom of movement, at least five degrees of freedom of movement, or at least six degrees of freedom of movement.

As shown in FIG. 1, the support arm 18 can include at least two elongated elements 24, 26. A proximal end 28 of the first elongated element 24 can be pivotably coupled, rotatably coupled, or both, to a mounting feature 30 used to couple the support arm 18 to a base surface (B). The distal end 32 of the first elongated element 24 can be pivotably coupled, rotatably coupled, or both, to the proximal end 34 of the second elongated element 26. The distal end 36 of the second elongated element 26 can be pivotably coupled, rotatably coupled and/or integral with a second end 22 of the support arm 18. In addition, any of the couplings between the mounting feature 30, the first elongated element 24, the second elongated element 26, and the second end 22 can be coupled so that no motion is possible. In some embodiments, the support arm 18 can include more than or less than two elongated elements. FIG. 1 shows an exemplary support arm having six degrees of freedom of motion, sold under the name FARO GOLD ARM, by Faro Technologies (Lake Mary, Fla.). The support arm includes two elongated elements 24, 26 that are pivotably and rotatably coupled to each other, a mounting feature 30 at a first end 20 of the support arm 18, and a second end 22 of the support arm 18.

The second end 22 can include a uniaxial load cell 16 operably attached to the support arm 18. The second end 22 can also include an end effector or probe 38. The end effector 38 can be operably attached to the uniaxial load cell 16 and the uniaxial load cell 16 can be operably attached to the support arm 18.

The portable load detection device 12 can include at least one sensor for determining a position of the second end. For example, the support arm 18 can include at least one sensor for determining the position of each of at least three couplings that provide the support arm 18 with at least three degrees of freedom of movement. In an exemplary embodiment, sensors can determine the angle of rotation for each of the pivotable joints 40 and rotatable joints 42 present in the support arm 18. Generally, a sensor will be disposed at the joint 40, 42 being measured within the support arm 18 and will not be externally visible.

The system 10 for measuring normal load and deflection can also include a processing system 44 in communication with the portable load deflection device. The processing system 44 can be operable to receive position data from the portable load deflection device 12 and corresponding force data from the load cell 16 when the second end 22 of the support arm 18 is used to apply a compression force to a test surface 14. The processing system 44 can calculate normal force versus deflection data for the test surface 14 resulting from normal or non-normal application of the compression force.

As used herein, "processing system" is used to describe a system capable of receiving the data required and performing the calculating operations disclosed herein. For example, the processing system can include one or more solid state processors and, optionally, one or more memory devices, which may be integral with the processor(s).

Figure 5:
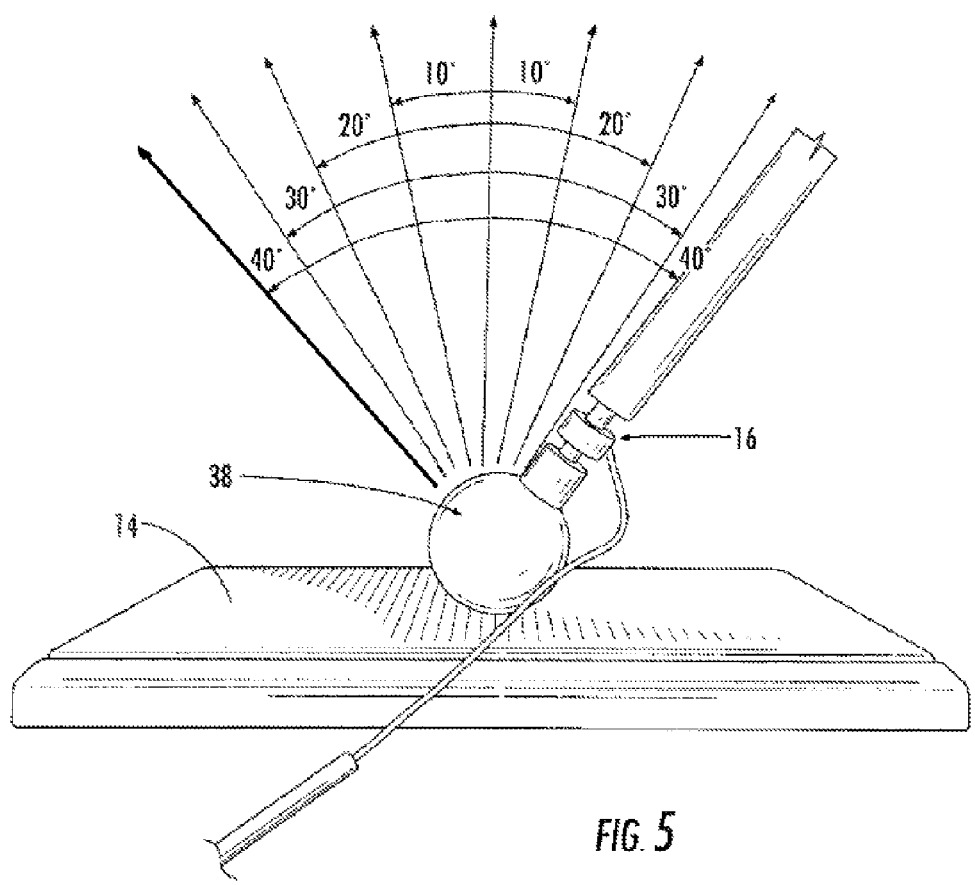
FIG. 5 is a drawing of a measuring arm attached to a load cell and a spherical end effector.

As used herein, "non-normal" application of force refers to application of force where the application of force to a surface is not aligned along a vector normal to the surface. The deviation from the normal vector can be any positive value less than 90°. The non-normal compression force can be applied at least 1 degree from normal to the test surface, at least 2.5 degrees from normal to the test surface, or at least 5 degrees, at least 7.5 degrees or even at least 10 degrees from normal to the test surface. The non-normal compression force can be applied less than 50 degrees from normal to the test surface, or less than 40 degrees from normal to the test surface, or even less than 30 degrees from normal to the test surface. FIG. 5 shows examples of angular deviations from the normal vector.

The processing system 44 can be in direct communication with the portable load deflection device 18, such as through wires 46. The processing system 44 can also be located remotely and can communicate with the portable load deflection device 12 via wireless technologies including, but not limited to, WIFI, Bluetooth, analog or digital wireless networks (such as 3G or 4G) and satellite.

The system 10 can include a deflection measuring actuator 48, e.g., button, pressure sensor, computer icon, etc. The system 10 can be designed such that, when the deflection measuring actuator 48 is activated, the processing system 44 receives position data from the portable load deflection device 12 and corresponding force data from the load cell 16. The processing system 44 can store the data when the deflection measuring actuator 48 is actuated. In use, an operator can press the deflection measuring actuator 48 and then apply a compression force to the test surface using the second end 22 of the support arm 18, while the processing system 44 receives and, optionally, stores the data. Thus, the deflection measuring actuator 48 serves as a trigger for the processing system 44 to begin collecting data during a compression cycle.

Figure 6:
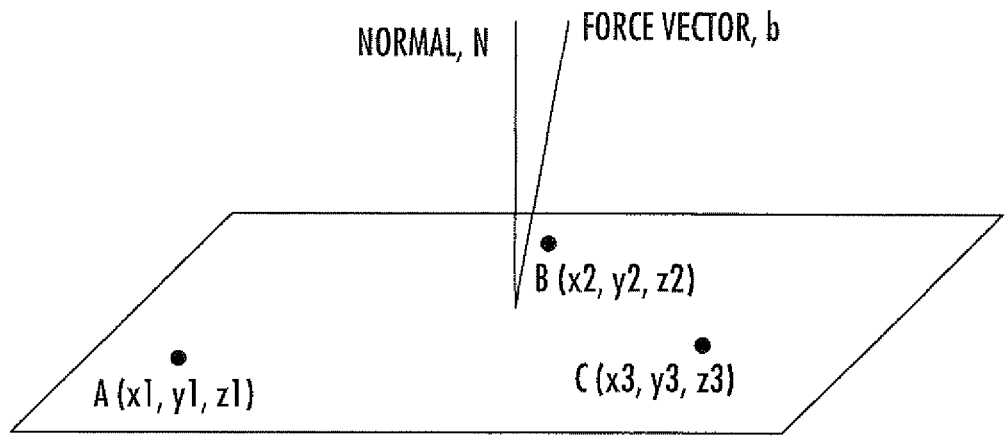
FIG. 6 is a drawing showing a surface, a normal vector and a non-normal force applied to the surface.

The processing system 44 can be operable to receive position data of a plurality of different points along the test surface to define an orientation of the test surface 14. The position data can be collected using the second end 22. For example, as shown in FIG. 6, three points (shown as A, B and C) can be located and used to define an orientation of the test surface 14. The orientation of the test surface 14 can be described in a variety of ways including, but not limited to, a normal vector, a plane and both.

The system 10 can include a position measuring actuator 50. The system 10 can be designed such that, when the position measuring actuator 50 is activated, the processing system 44 receives position data from the portable load deflection device 12 and uses the position data to determine an orientation of the test surface 14. In use, an operator can hold the second end 22, e.g., the end effector 38, against the test surface 14 and press the position measuring actuator 50.

The operator can hold the second end 22 against the test surface 14 applying minimal or no load and causing minimal or no compression to the surface, e.g., less than 0.5 mm deflection, or less than 0.1 mm deflection, or less than 0.05 mm deflection. In an alternative embodiment, a non-contact measuring device, e.g., a laser, can be used to determine points for determining the orientation of the test surface 14. When the position measuring actuator 50 is activated, the processing system 44 can receive the position of the second end 22 of the support arm 18 and can receive and, optionally, store the position data for use defining the orientation of the test surface 14.

The processing system 44 can be operable to calculate normal force versus deflection data from the test surface 14 orientation information and the position data and corresponding normal force data obtained during the deflection measuring routine. The normal force versus deflection data can be communicated to and displayed by an output device. Exemplary output devices include, but are not limited to, an electronic storage, a visual display, and a printer.

The output device can be in direct communication with the processing system 44, such as through wires. The output device can also be located remotely and can communicate with the processing system 44 via wireless technologies including, but not limited to, WIFI, Bluetooth, analog or digital wireless networks (such as 3G or 4G) and satellite.

In another embodiment, the invention can be drawn to a method for measuring normal load and deflection of a material. The method can include providing the portable load deflection device described herein and applying a non-normal compression force to a test surface using the second end. The method can also include obtaining position data and corresponding force data during the force applying step, and determining normal force versus deflection data for the test surface resulting from the compression force, which can be a non-normal compression force. The compression force can be applied manually.

The method can also include defining an orientation of the test surface using the second end. Normal force versus deflection data can be calculated using the orientation of the test surface in combination with the position data and the corresponding compression force data.

EXAMPLES

The portable load deflection device was used to obtain results during various experiments on four different objects. The portable load deflection device may be used to measure the differences between cartilage in patients with pectus excavatum and healthy volunteers.

The testing device may be formed from a load cell that is attached to a coordinate measuring machine to measure load-deflection. The signal from the load cell may be sent to the computer through a Data Acquisition System. The real time position of the coordinate measuring machine may be displayed in a custom program written in LabVIEW, which is sold by National Instruments in Austin, Tex., along with the force measured by the load cell.

As shown in FIG. 1, the portable load deflection device may be formed from a support arm having six degrees of freedom, such as the Faro Gold Arm, which is sold by Faro Technologies, Lake Mary, Fla. The portable load deflection device is a highly accurate coordinate measuring machine that measures position. The portable load deflection device may have a published accuracy of +/−0.051 mm, the ability to accommodate different end effectors, the ability to seamlessly calibrate the system with any end effector and an operating range which is a four-foot radius from the base. The portable load deflection device may consist of two trigger buttons, six rotating revolute joints (to allow for six degree of freedom motion), an error box 52 with light emitting diodes (LEDs) indicating the errors in the positioning of the joints, end effectors used for various applications, a power supply box, a cable to connect the portable load deflection device to the power supply box and a serial cable, as shown in FIGS. 1 and 3.

The portable load deflection device may have the ability to accommodate the different sized end effectors, and can also accommodate a sensor, such as a load cell. The green trigger button, nearest the end effector, is alternately referred to as the Front Button or the deflection measuring actuator, and the red button, furthest from the end effector, is referred to as the Back Button or the position measuring actuator.

Calibration confirms the accuracy of the portable load deflection device. The location of the end effector may be collected by triggering the Front and Back buttons. The two trigger buttons may send different signals through the serial port to the computer, and a separate subroutine within the LabVIEW program may be established for each of these buttons. Triggering the Front Button, i.e., the deflection measuring actuator, actuates a subroutine designed to measure load versus displacement. Triggering the Back Button, i.e., the position measuring actuator, automatically records the location of the end effector. It should be understood that the spatial orientation of the deflection and position measuring actuators can be reversed and that the deflection and position measuring actuators can be locate at other positions within the portable load versus deflection measuring system.

Figure 3:
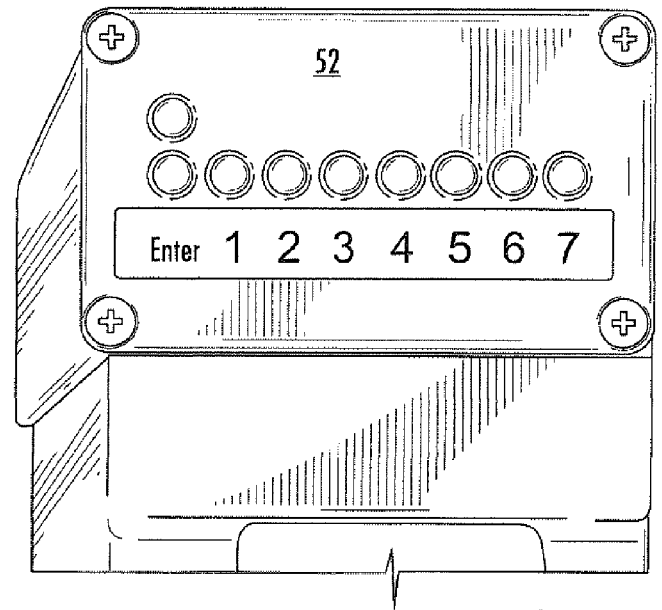
FIG. 3 is a drawing showing the error box disclosed herein.
Figure 4:
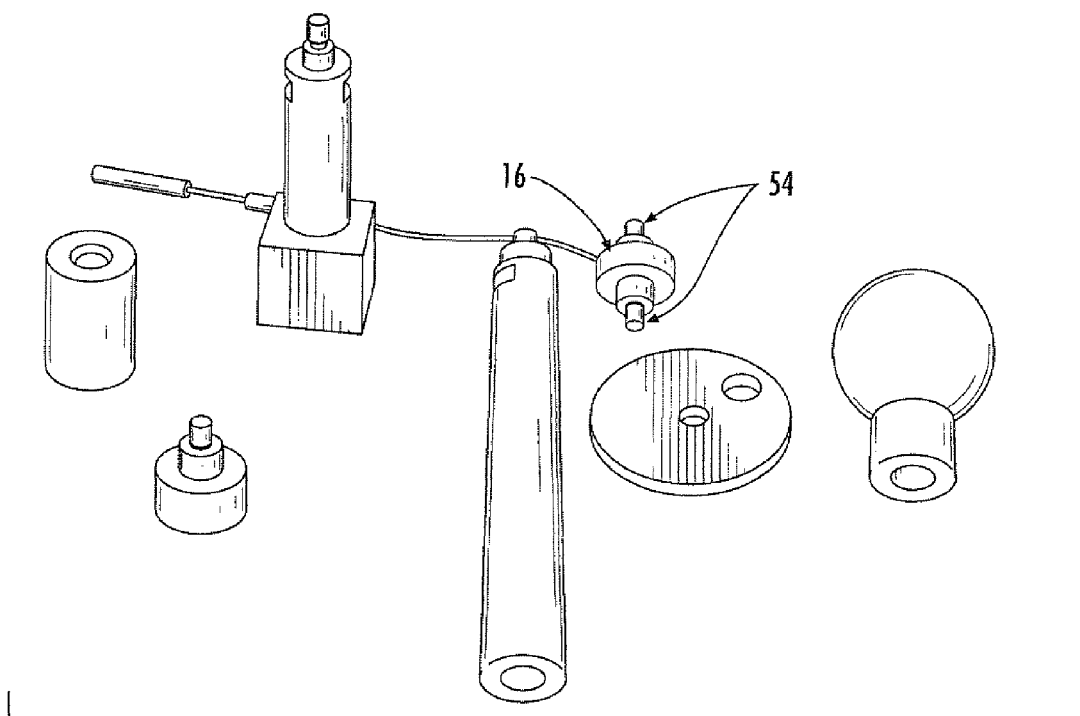
FIG. 4 is a drawing showing a variety of load cell effectors and accessories.

The portable load deflection device has an error box 52, as shown in FIG. 3, which indicates if there is any degree of freedom restricted. The error box 52 may consist of eight red Light Emitting Diodes (LEDs) and one green LED. When the portable load deflection device is started from rest, all of the LED's in the error box are illuminated indicating that each degree of freedom in the portable load deflection device must be rotated. The red LEDs are marked 1 to 6 in the error box and are illuminated if any of the six degrees of freedom are configured out of the maximum range of rotation. If an error occurs, it can be resolved by adjusting the degree of freedom with the error. Once the portable load deflection device is error free, only the green LED is illuminated. If there is an error in any of the degrees of freedom during operation of the portable load deflection device, the respective red LED illuminates and an alarm sounds until the error is resolved. The signal from the portable load deflection device may be transferred to the computer through a RS 232 serial port. Software, such as, but not limited to, Free Serial Port Monitor, which is sold by HHD Software of London, UK, may be used to read and display the data transferred through the serial port to the computer and to determine which pin corresponds to which output of the portable load deflection device using American Standard Code for Information Interchange (ASCII). The portable load deflection device may be used with any end effectors capable of transmitting loads up to about 100 pounds, such as those shown in FIG. 4.

Load Cell

A load cell may be incorporated into the portable load deflection device to capture load readings. In one embodiment, a uniaxial load cell, such as a LC 201, 100 pound stainless steel load cell, which is sold by Omegadyne, Inc. of Sunbury, Ohio, may be used together with a cDAQ 9172 and NI 9237 data acquisition system to capture the load readings. The load cell may be calibrated in compression, against standard weights. A calibration curve may be created, and the slope of the calibration curve may be used to convert volts to load. The LC201 uniaxial load cell may only measures the load applied along the threaded studs 54. The uniaxial load cell does not consider loads applied in the direction of any other axis. The portable load deflection device may have the capacity of being configured at any angle. A load applied by the portable load deflection device may not be applied perfectly along the axis of the load cell. However, the load may be determined using the equations below. The load cell was tested for its accuracy when load is applied at an angle with respect to the test surface and the load cell is then rotated with respect to its own axis between 12, 3, 6, and 9 o'clock positions, respectively. Also, the portable load deflection device must consider the angle of application from vertical, using the formula in equation 1, $$\text{Normal Force, } F_N = F \times \cos(\theta) \quad (1)$$

where, $$\cos(\theta) = \frac{N \cdot b}{|N||b|},$$

$\theta$ = The angle between the normal to the surface that the load is being applied to and the end effector.

F = the force applied.

N = Normal vector b = Force vector

The normal to the plane of load application may be calculated by collecting three points on that plane, as shown in FIG. 6.

Data for three points, taken on the base plane of orientation of the object, may be stored by triggering the back button. This data may be used to find the normal to the plane using equation 2.

$$\text{Normal, } N=(B-A)\times(C-A) \quad (2)$$

where, A, B, C=Three different points taken by Faro Arm, on the plane of measurement.

Each of the points of A, B and C may have an x, y and z coordinate. Thus, there are three x, three y and three z values. The force vector may be calculated by taking two points, one at the end of the end effector and another one at one inch away from the first point along the central axis of the end effector. If there were two points A (xA, yA, zA) and B (xB, yB, zB), then the force vector from point A to B may be given by:

$$(xB-xA)i, (yB-yA)j, (zB-zA)k \quad (3)$$

Figure 7:
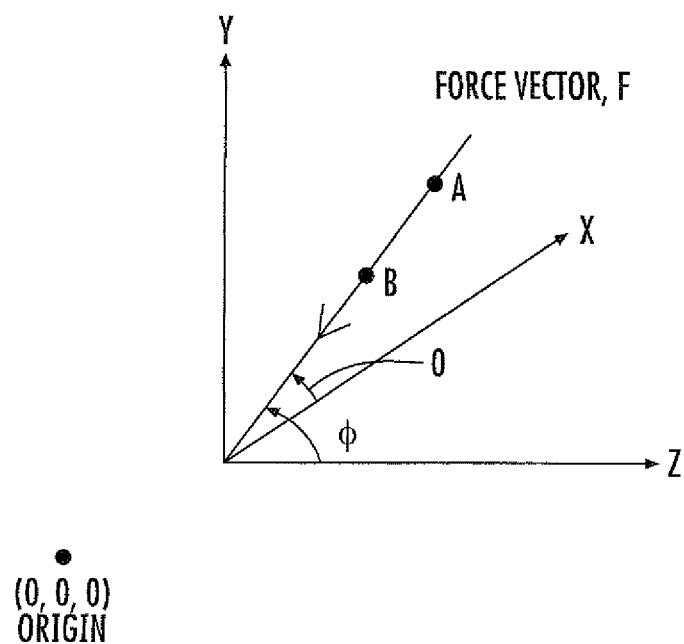
FIG. 7 is a drawing showing a coordinate system for a force vector.

The visual illustration of the force vector with X, Y and Z axis is shown in FIG. 7. In FIG. 7, phi ($\phi$) is the angle on the Z-Y plane between the Z axis and the force vector, F, while theta ($\theta$) is the angle on the X-Y plane between the X axis and the force vector, F.

The data from the portable load deflection device gives the position of the point B (x, y and z position of B was known). Therefore, to find the position of the point A, following formulas were used:

$$xA = xB + L \times \cos(\theta) \times \sin(\phi) \quad (4)$$

$$yA = yB + L \times \sin(\theta) \times \sin(\phi) \quad (5)$$

$$zA = zB + L \times \cos(\phi) \quad (6)$$

Equation 3 was followed to get the force vector.

$$\therefore \text{NormalForce, } F_N = F \times \frac{N \cdot b}{|N||b|} \quad (7)$$

$$= F \times \frac{N_x \times b_x + N_y \times b_y + N_z \times b_z}{\sqrt{N_x^2 + N_y^2 + N_z^2} \times \sqrt{b_x^2 + b_y^2 + b_z^2}}$$

where,
F=Force readings from the load cell;
N=Normal vector to the plane, calculated using the equation of normal vector;
b=Force vector going through points A and B;
$N_x$=Value of x coordinate of Normal vector;
$N_y$=Value of y coordinate of Normal vector;
$N_z$=Value of z coordinate of Normal vector;
$b_x$=Value of x coordinate of Force vector;
$b_y$=Value of y coordinate of Force vector; and
$b_z$=Value of z coordinate of Force vector.

Calculation for Deflection

To find the deflection of any object, the front button on the portable load deflection device may be triggered to store the start point of deflection, and the front button may be triggered a second time to store the end point of deflection. To store continuous deflection data, the front button may be triggered and held until the required force was applied. The following equation may be used to find the deflection from these points.

$$\text{Deflection, } \delta = \sqrt{(x_2-x_1)^2+(y_2-y_1)^2+(z_2-z_1)^2} \quad (8)$$

where,
$x_1$=x value of the first point;
$x_2$=x value of the last point;
$y_1$=y value of the first point;
$y_2$=y value of the last point;
$z_1$=z value of the first point; and
$z_2$=z value of the last point.

Material Testing

Figure 8:
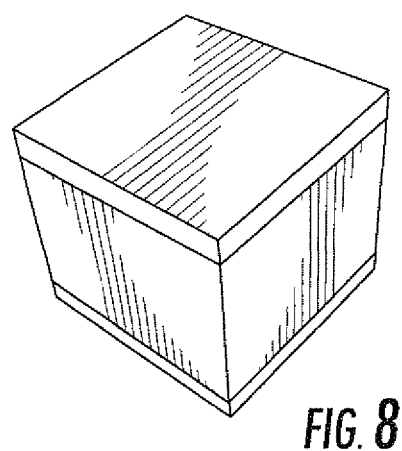
FIG. 8 is a picture of a closed cell neoprene and gum rubber cube used as a test surface.
Figure 9:
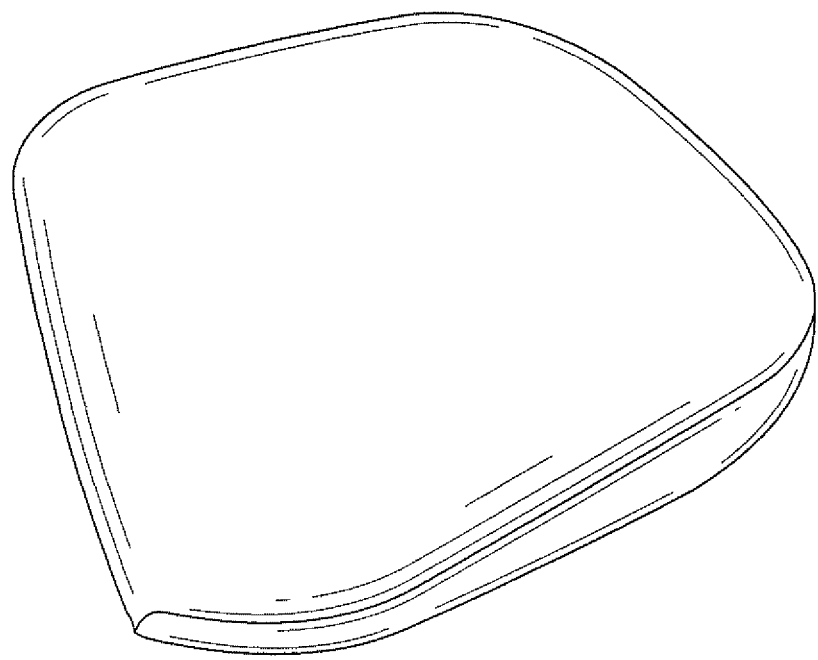
FIG. 9 is a picture of a chair cushion used as a test surface.
Figure 10:
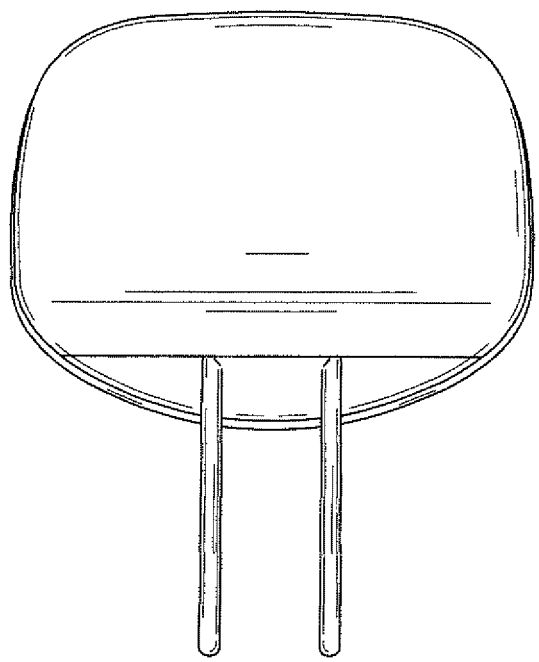
FIG. 10 is a picture of a head restraint.

Four materials were tested three times in various positions to test the portable load deflection device. The first material tested was closed cell neoprene material formed from a neoprene gum rubber cube, as shown in FIG. 8. The second material tested was gum rubber material formed from neoprene into gum rubber cube, as shown in FIG. 8. The third material tested was a chair cushion, as shown in FIG. 9, and the fourth material tested was a head restraint of a car, as shown in FIG. 10.

The first test of the materials was conducted using a material testing machine, the MTS Alliance RF/300, which is sold by MTS Systems Corporation of Eden Prairie, Minn., to collect load and deflection data. The materials were tested using the MTS machine under a load of up to 25 pounds. The second test, which consisted of two parts, was conducted using the portable load deflection device. The first part collected load deflection data at discrete points, and the second part collected load deflection data collected continuously.

Results

The load cell compression test resulted in the mean values for slope of the voltage vs. load curve in compression loading. The calibration factor was 0.00016. The load cell test using the spherical end effector revealed that the load cell with the wire positioned up has significantly less error than the wire positioned down and the wire centered. The load-deflection slope was measured using the portable load deflection device, and the tests were conducted on neoprene, gum rubber, chair cushion and head restraint. The results from each test were compared with the results from the MTS using the method proposed by Bland and Altman. For neoprene, the mean difference between the MTS results and the portable load deflection device results was −1.6 lbs/inches, and the 95% confidence interval ranged from −10.91 lbs/inches to 7.8 lbs/inches. For the gum rubber side of the composite cube, the mean difference between the MTS results and the portable load deflection device results was −1.9 lbs/inches, and the 95% confidence interval ranged from −32.6 lbs/inches to 28.8 lbs/inches. For the chair cushion, the mean difference between the MTS results and the portable load deflection device results was 0.3 lbs/inch, and the 95% confidence interval ranged from −2.5 lbs/inches to 3.2 lbs/inches. For the head restraint, the mean difference between the MTS results and the portable load deflection device results was −4.4 lbs/inches, and the 95% confidence interval ranged from −7.7 lbs/inches to −1.1 lbs/inches.

Discussions

The portable load deflection device may be configured to determine the behavior of a material under various loading conditions. The portable load deflection device may have applications in various fields such as mechanical engineering, aerospace engineering and other appropriate fields.

Results Interpretation

The portable load deflection device produced results that were in agreement with results generated by the material testing machine. The portable load deflection device may be used at any orientation while the conventional MTS cannot be used in any orientation. Rather, the conventional MTS system may only be used in linear alignment. The portable load deflection device may provide accurate readings when the end effector is oriented within 20 degrees of an axis that is normal to the surface being measured when the load cell wire is positioned in an up position or in a center position. The portable load deflection device may measure loads within a range of between one pound and 100 pounds. The portable load deflection device may accommodate any custom made or standard end effector. The effector may be attached to the end of the support arm with a releasable connection, such as, but not limited to a threaded connection. The portable load deflection device may be used in biomechanics as a device to measure mechanical properties in vivo, e.g. measuring in vivo load deflection of rib cage, sternum or other body part. The portable load deflection device may also be used in any other application to measure load deflection, e.g. measuring load deflection of a head restraint in crash analysis.

To prove that the portable load deflection device is capable of detecting the differences between two different materials, the 95% confidence interval measured on neoprene was compared with the results from a study which compares healthy cartilage and cartilage from children with pectus excavatum. The mean strength of the sixth costal cartilage between the experimental group (patients with pectus excavatum) and the control group (healthy people without any deformity of chest) was 1.33+/−0.22 MPa and 8.29+/−0.98 MPa, respectively. To determine if the portable load deflection device was sensitive enough to detect approximately a 7 MPa difference in data, stress strain curves were obtained for the tests conducted on the neoprene. The slopes from the stress strain curve were calculated and converted to the MPa values. From this data, Bland-Altman plots were generated between the MTS and the hardware readings and the 95% confidence interval ranged from −9605.9 Pa to 6923.9 Pa. This interval suggests that the portable load deflection device may be capable of detecting differences of less than 0.02 MPa, which is sufficient to detect the difference between cartilage affected by pectus excavatum and healthy cartilage, which is an intended use for this device.

The portable load deflection device was designed for load to be applied by a human. As such, the portable load deflection device is designed for loads between about 100 pounds and about one pound, and not fir loads outside of this range. For smaller or larger loads, machine controlled devices may be used. The portable load deflection device is limited by the sensitivity of the load cell when loads are applied at an angle. In particular, the portable load deflection device is limited to loads directed at angles less than about 45 degrees when the load cell is positioned up, which is the 12 o'clock position, and limited to loads directed at angles less than 20 degrees when the load cell was positioned in the center, which is the 3 or 9 o'clock position. Error in the load cell reading depends on the position of the strain gauge within the load cell. This limitation may be overcome in the portable load deflection device by using a multiaxial load cell together with modifications to the LabVIEW program. However, using the portable load deflection device together with a single axis load cell is much more cost effective.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

The invention claimed is:

1. A system for measuring normal load and deflection of a material, comprising:
 a portable load deflection device, comprising a support arm having a first end and a second end opposite said first end, said first end for attachment to a base surface,
 (i) wherein said support arm provides at least three degrees of freedom of movement,
 (ii) wherein said second end comprises a uniaxial load cell operably attached to said support arm, and
 (iii) wherein said support arm comprises at least one sensor for determining a position of said second end;
 a processing system in communication with said portable load deflection device, wherein said processing system is operable to:
  receive position data from said portable load deflection device and corresponding force data from said load cell when said second end is used to apply a compression force to a test surface, and
  calculate normal force versus deflection data for said test surface resulting from non-normal application of said compression force,
  wherein the non-normal application is applied along a first vector deviating from a second vector by a deviation angle,
  wherein the second vector is normal to the test surface, and
  wherein the deviation angle is any positive value less than 90°.

2. The system according to claim 1, wherein said second end further comprises an end effector.

3. The system according to claim 2, wherein said end effector is operably attached to said uniaxial load cell and said uniaxial load cell is operably attached to said support arm.

4. The system according to claim 1, wherein said support arm provides at least four degrees of freedom of movement.

5. The system according to claim 1, wherein said system further comprises a deflection measuring actuator, wherein, after said deflection measuring actuator is activated, said processing system receives position data from said portable load deflection device and corresponding force data from said load cell.

6. The system according to claim 1, wherein said processing system is further operable to: receive position data of a plurality of different points along said test surface obtained using said second end to define an orientation of said test surface.

7. The system according to claim 6, wherein said processing system is operable to calculate normal force versus deflection data from said position data and said corresponding normal force data using said orientation.

8. The system according to claim 6, wherein said system further comprises an position measuring actuator, wherein, after said position measuring actuator is activated, said processing system receives position data taken along said test surface by said second end.

9. The system according to claim 8, wherein said system further comprises a deflection measuring actuator, wherein, after said deflection measuring actuator is activated, said processing system receives position data from said portable load deflection device and corresponding force data from said load cell.

10. The system according to claim 6, wherein said support arm provides at least four degrees of freedom of movement.

11. The system according to claim 6, wherein said processing system is operable to calculate normal force versus deflection data from said position data and said corresponding normal force data using said orientation;
 wherein said system further comprises an position measuring actuator, wherein, after said position measuring actuator is activated, said processing system receives position data taken at along said test surface by said second end; and
 wherein said system further comprises a deflection measuring actuator, wherein, after said deflection measuring actuator is activated, said processing system receives position data from said portable load deflection device and corresponding force data from said load cell.

12. The system according to claim 11, wherein said support arm provides at least four degrees of freedom of movement.

13. A method for measuring normal load and deflection of a material, comprising:
   providing a portable load deflection device, comprising a support arm having a first end and a second end opposite said first end, said first end for coupling to a base surface,
   (i) wherein said support arm provides at least three degrees of freedom of movement, and
   (ii) wherein said second end comprises a uniaxial load cell operably coupled to said support arm;
   applying a non-normal compression force to a test surface using said second end;
   obtaining position data and corresponding force data during said applying step; and
   determining normal force versus deflection data for said test surface resulting from said non-normal compression force,
   wherein the non-normal compression force is applied along a first vector deviating from a second vector by a deviation angle,
   wherein the second vector is normal to the test surface, and wherein the deviation angle is any positive value less than 90°.

14. The method according to claim 13, wherein said non-normal compression force is applied manually.

15. The method according to claim 13, further comprising, defining an orientation of said test surface using said second end.

16. The method according to claim 15, further comprising, calculating normal force versus deflection data from said position data and said corresponding compression force data using said orientation.

17. The system according to claim 13, wherein said support arm provides at least four degrees of freedom of movement.

18. The system according to claim 13, wherein said non-normal compression force is applied at least 1 degree from normal to said test surface.

19. The system according to claim 13, wherein said non-normal compression force is applied manually; and said non-normal compression force is applied more than 5 degrees from normal to said test surface.

20. The system according to claim 1, wherein said support arm provides at least six degrees of freedom of movement.

* * * * *